Figure 1:
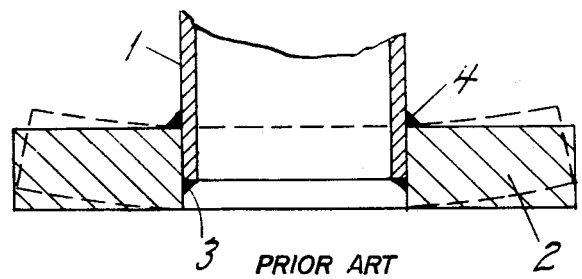

United States Patent [19]

Ekberg et al.

[11] 4,105,227
[45] Aug. 8, 1978

[54] FLANGE JOINT BETWEEN PIPE LENGTHS

[76] Inventors: Sven Erik Ekberg; Ove Leonard Ekberg, both of 891 23 Själevad, Sweden

[21] Appl. No.: 795,883

[22] Filed: May 11, 1977

[51] Int. Cl.² ............................................. F16L 23/00
[52] U.S. Cl. ..................................... 285/412; 285/416
[58] Field of Search ............... 285/368, 412, 416, 363, 285/405

[56] References Cited

U.S. PATENT DOCUMENTS

| | | | |
|---|---|---|---|
| 2,274,439 | 2/1942 | Tinker | 285/416 |
| 2,303,311 | 11/1942 | Gredell | 285/368 X |
| 2,695,184 | 11/1954 | Hobbs | 285/368 X |
| 3,387,867 | 6/1968 | Rogers | 285/368 X |
| 3,720,428 | 3/1973 | Zastawny | 285/368 |
| 3,764,170 | 10/1973 | Brown | 285/368 X |
| 3,850,455 | 11/1974 | Stafford | 285/368 X |

*Primary Examiner*—Werner H. Schroeder
*Assistant Examiner*—C. J. Arbes

*Attorney, Agent, or Firm*—Young & Thompson

[57] ABSTRACT

The invention resides in a flange joint for use in the assembly of pipings from pipe elements. A fixed sealing flange is welded to each of the opposite ends of two adjacent pipe lengths and/or pipe fittings. Each sealing flange has two annular concentric contact surfaces on the back thereof separated by one relatively deep and broad circular groove in said back, or by a number of relatively deep but narrow annular concentric grooves. A loose flange is threaded on to each of the opposite ends of said pipe lengths or fittings behind the fixed sealing flange, such loose flange having a greater diameter than the sealing flange. The flange joint is tightened by means of bolts and nuts received in a number of holes through the part of said loose flanges located beyond the circumference of the fixed sealing flanges, causing the loose flanges to engage said annular concentric contact surfaces of the sealing flanges. The outer one of said contact surfaces is to be slightly depressed in relation to the inner one.

2 Claims, 3 Drawing Figures

FLANGE JOINT BETWEEN PIPE LENGTHS

The present invention refers to flange joints between pipe lengths and/or pipe fittings in pipings. More particularly, the invention is intended to be applied to pipings which are used in the cellulose industry, chemical industry, ship building and other branches where the pipings have to be composed of parts of acidproof or stainless steel.

The assemblage of pipe lengths and/or pipe fittings to form a piping is most often carried out by means of flanged joints which consist of annular flanges which have been welded or otherwise fixed to the pipe ends and are connected with each other by means of bolts. More particularly, it is also known in this connection to make use of so called loose flanges which have been mounted on the pipe ends behind the fixed flanges and are provided with holes through which the bolts extend beyond the circumference of the fixed flanges.

In practice it has been found that the welded annular flanges, in the following referred to as welding rings, may have become deformed in consequence of the thermal stresses occurring during the welding operation to such an extent that it is often impossible to obtain satisfactory sealing between the flanges of the flanged joint by tightening the nuts on the uniting bolts. It is known to counteract the deformation of fixed welding rings by providing them with a relatively broad and deep groove turned out in the back (and possibly also in the front) thereof. Through the presence of this groove the welding rings will besides be slightly resilient, which has as a result that possible deviations from a plane condition of the sealing surfaces after the welding operation can be neutralized, when the surfaces are pressed together by tightening the nuts on the bolts.

Now it has been found, however, that in the case of flanged joints which include loose flanges behind the fixed welding rings and which are thus united by bolts through these loose flanges, the provision merely of such a groove in the back of the welding rings as mentioned above results in an admittedly improved but yet not quite satisfactory sealing effect between the welding rings, when tightening the bolts, more particularly if one has to deal with pipings in which the flowing medium is under a certain pressure. The reason for this has been found to be that the initially plane loose flanges upon the tightening of the bolts which are situated beyond the circumference of the welding rings assume a shape bent slightly conically down over the welding rings which has as a result that they will be seated on the annular contact surface, lying beyond the groove in the respective welding ring, on the back of the welding ring with a high pressure but, on the other hand, exert a lower and possibly even down to zero reduced pressure on the annular contact surface lying inward in relation to the groove.

By the present invention an improved flange joint between pipe lengths and/or pipe fittings has been provided which consists of welding rings which are welded each to one of the pipe ends, and of loose flanges which are each threaded on to one of the pipe ends behind the associated welding ring and arranged to be clamped together by means of bolts through holes therein beyond the circumference of the welding rings, the characteristic of this flange joint being that the welding rings on the back thereof have two annular contact surfaces which are separated from each other by a relatively deep and broad annular groove, or by a number of relatively deep but narrow annular concentric grooves, and of which surfaces the outer one is slightly depressed in relation to the inner one, so that on a conical deflection of the loose flanges over the welding rings occurring when clamping them together by means of the bolts an equalized distribution of the pressure of the loose flanges on the outer and inner contact surfaces is obtained and thereby an efficient sealing between the welding rings pressed together against each other is achieved.

Figure 2:
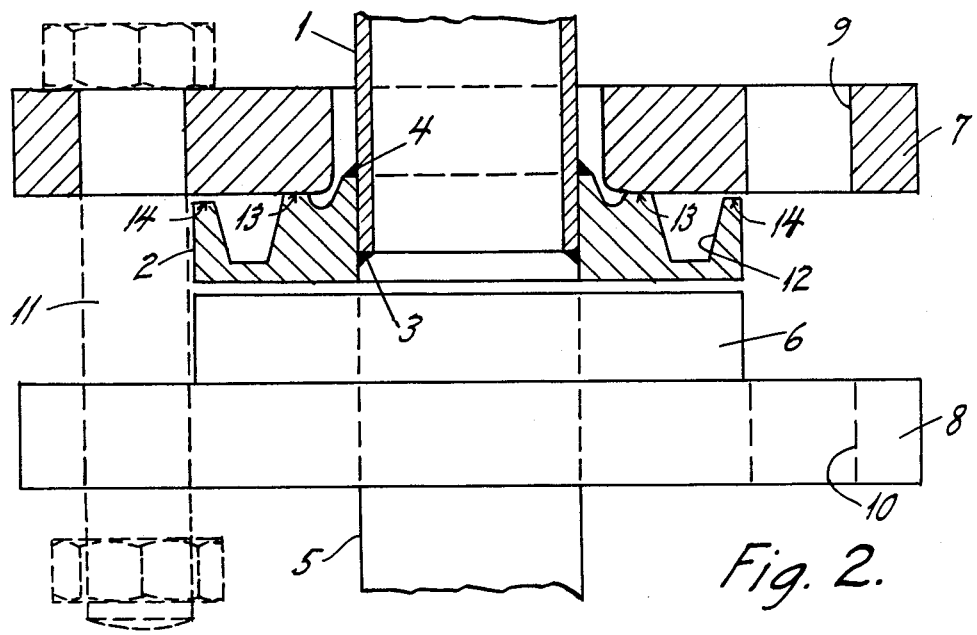
Figure 3:
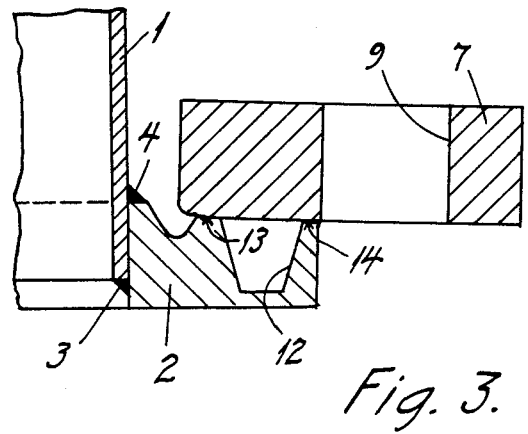

For making the invention clear the accompanying drawing is referred to. FIG. 1 shows in cross-section a broken end portion of a pipe length and a welding ring of conventional construction welded thereto. FIG. 2 shows a flange joint according to the invention between two pipe ends comprising fixed welding rings and behind them loose flanges before pressing the welding rings together against each other, the upper half of the flange joint, as seen in the figure, being shown in section. FIG. 3 depicting only a broken portion of one pipe end and its welding ring and loose flange in cross-section illustrates the seating of the loose flange against the welding ring, when the flange joint is assembled and the welding rings are held tightly pressed against each other.

In FIG. 1, on the end of a pipe 1 of acidproof or stainless steel there is mounted a welding ring 2 in a manner such that the end of the pipe does not quite reach the plane-turned front surface of the welding ring 2. The welding ring is fastened by means of two annular weld joints 3 and 4, of which one 3 is an internal weld joint around the end edge of the pipe 1 and the other 4 is an external weld joint at the back of the welding ring where the pipe leaves the ring. The figure shows, in dashed lines and in exaggerated measure, the deformation which the welding ring may suffer as a consequence of the thermal stresses occurring in the welding thereof.

In a generally known manner, the flange joint shown in FIG. 2 on the drawing between two pipe ends 1 and 5 comprises welding rings 2 and 6, respectively, which are welded to each pipe and similarly as in FIG. 1 by means of weld joints 3 and 4 (shown for the upper half of the flange joint only), so that the edge of the pipe end does not quite reach the plane-turned face of the welding ring, and loose flanges 7 and 8, respectively, mounted one behind each welding ring. The two loose flanges have a number of holes 9 and 10, respectively, situated beyond the circumference of the welding rings for the passage of tightening bolts with nuts, by means of which the flange joint may be assembled with the plane-turned faces of the welding rings closely engaging each other. One of these tightening bolts with its associated nut is shown in dashed lines at 11. Each welding ring 2 and 6, respectively, has a relatively deep and broad annular groove 12 in its back, through which groove, as explained in the opening paragraphs, a deformation of the welding rings such as indicated in FIG. 1 upon the welding thereof to the pipe ends is avoided and the welding rings besides become slightly resilient. If desired, each welding ring may have several relatively deep but narrow annular concentric grooves in its back. According to the invention each welding ring 2 and 6, respectively, furthermore has two annular contact surfaces 13 and 14, respectively, for the loose flanges 7 and 8, respectively, which surfaces are separated by the groove 12 and of which surfaces the outer one 14 is depressed in relation to the inner one 13 a small distance which according to the diameter of the welding rings 2 or 6 may vary between 0.1 and 0.4 mm but usually is of the order of 0.2 mm.

When the loose flanges 7 and 8 are clamped together by tightening the bolts 11 inserted through the holes 9 and 10, they will be subjected to a certain conical deflection over the welding rings 2 and 6. If the two contact surfaces 13 and 14 of the welding rings were flush with each other, this deflection would cause the welding rings to be pressed together with a higher pressure against the outer contact surfaces 14 than against the inner ones 13 so that satisfactory sealing between the faces of the welding rings would be obtained only over part of their surface area. By having the outer contact surface 14 depressed in relation to the surface 13 the clamping pressure will be redistributed, however, so that an equalization of the pressures on the inner and outer contact surfaces is realized and as a consequence an acceptable sealing over the whole area of the faces of the welding rings is obtained. It is important to note that the difference in level between the contact surfaces 13 and 14 must not be too great, as this would have as a result that the whole clamping pressure in the borderline case would be applied to the inner contact surfaces 13 having as a consequence an inferior sealing effect.

We claim:

1. A flange joint for use in the assembly of pipings from pipe elements, comprising in combination sealing flange means mounted around and welded to the outermost end portion of each of adjacent pipe elements, the front faces and back faces of said sealing flange means of said adjacent pipe elements opposing and being turned away from each other, respectively, there being two annular concentric contact surfaces on each of said back faces separated by relatively deep circular groove means in said back faces, the radially outer one of said concentric contact surfaces being depressed in relation to the radially inner one, clamping flange means slidably mounted on each of said pipe elements and capable of engaging said concentric contact surfaces, said clamping flange means extending beyond the circumference of said sealing flange means and having a number of holes in the thusextending part thereof, and bolt and nut means received in the holes of said clamping flange means of said adjacent pipe elements for clamping said clamping flange means together thereby causing a conical deflection thereof to engage said radially outer as well as said radially inner annular concentric contact surfaces of said sealing flange means for achieving an essentially equalized distribution of pressure on said radially inner and outer annular contact surfaces and for securing efficient sealing between the opposing front faces of said sealing flange means.

2. A flange joint as claimed in claim 1, said circular groove means comprising a single broad circular groove.

* * * * *